United States Patent Office 3,547,581
Patented Dec. 15, 1970

3,547,581
PROCESS FOR REMOVING FLUORINE AND PHOSPHATE FROM GYPSUM PRODUCED IN THE MANUFACTURE OF PHOSPHORIC ACID
Wolfgang Gauster, Linz (Danube), Walter Müller, Leonding, near Linz (Danube), and Ferdinand Weinrotter, Linz (Danube), Austria, assignors to Osterreichische Stickstoffwerke Aktiengesellschaft, Linz (Danube), Austria
No Drawing. Filed Apr. 2, 1968, Ser. No. 718,217
Claims priority, application Austria, Apr. 7, 1967, 3,306/67
Int. Cl. C01f 11/46
U.S. Cl. 23—122
3 Claims

ABSTRACT OF THE DISCLOSURE

A working-up of the gypsum produced in the manufacture of phosphoric acid by the reaction of crude phosphate with sulphuric acid in order to obtain a gypsum free from fluorine and phosphate. The moist filtered gypsum is mixed with silica and sulphuric acid and heated to a temperature of 200° to 400° C., washed with water after cooling and then the anhydrite is separated from the water.

---

This invention relates to a process for the purification of gypsum and, more particularly, to a process for removing fluorine and phosphate from the gypsum precipitated in the production of phosphoric acid.

In the manufacture of phosphoric acid by the reaction of crude phosphate with sulphuric acid about five tons of gypsum are produced per ton of phosphorus pentoxide. Whilst hitherto the gypsum has been discarded as a waste product, a working-up of the gypsum is now absolutely essential as a result of the greatly increased phosphoric acid production resulting from the increased use of higher-strength mixed fertilisers, and the strict legal regulations regarding the contamination of river water.

Small quantities of the gypsum resulting from the production of phosphoric acid are used in the building industry for the manufacture of sheets, in the cement industry as a setting regulator, and for the manufacture of ammonium sulphate. However, the amount of gypsum from the production of phosphoric acid which can be employed for these purposes is limited.

It is known to mix gypsum or anhydrite with certain quantities of additives and coal or coke as reducing agents and to heat the mixture in a rotary furnace until it sinters. Sulphur dioxide is evolved and is processed to sulphuric acid in a subsequent plant, whilst the residue, after cooling and grinding, yields a cement corresponding to the standard specifications. Now it would be obvious to use the gypsum from the manufacture of phosphoric acid in this process. This would make it possible to recover the sulphuric acid needed for the manufacture of the phosphoric acid and thus to recycle it. At the same time the calcium of the crude phosphate would also be converted to an industrially valuable form.

However, the use of the gypsum, in the form in which it is produced in the manufacture of phosphoric acid, is not possible in the above-mentioned process. The gypsum contains fluorine and phosphate as mainly harmful impurities. Whilst the phosphate, regardless of the form in which it is present in the gypsum, reduces the quick setting of the cement so that from $P_2O_5$ contents of about 1% upwards in the cement the required standard specifications are no longer obtained, the fluorine, in the amounts in question, whilst not being harmful to the quality of the cement, interferes with the furnace operating procedure by forming melt phases if it is present as calcium fluoride in the gypsum. Fluorides and silicofluorides furthermore form volatile silicon tetrafluoride with the silica which is always present in the crude powder, and this damages the sulphuric acid catalyst.

In order to ensure trouble-free operation of the furnace and of the subsequent sulphuric acid plant, and to obtain a cement which meets standard specifications, it is thus necessary substantially to remove the fluorine and the phosphate from the gypsum produced in the manufacture of phosphoric acid.

Attempts to wash the compounds containing fluorine and phosphate out of the gypsum produced in the manufacture of phosphoric acid by means of water failed because, whilst considerable quantities of the fluorine-containing compounds dissolved, the phosphate content in the gypsum was reduced only insignificantly.

It has now surprisingly been found that the phosphate can be washed out with water if the gypsum is first calcined, to give the semi-hydrate or anhydrite. However, calcining the gypsum at excessively high temperatures must at the same time be avoided since otherwise water-insoluble dicalcium and tricalcium phosphates are formed.

It has furthermore been found that the fluorine present in the gypsum produced in the manufacture of phosphoric acid is in the form of calcium fluoride and alkali silicofluoride, with about 80% of the fluorine being present as silicofluoride, with the ratio of these two substances to one another being dependent on the variety of crude phosphate employed. Both fluorides and silicofluorides react on heating with silica and sulphuric acid to form gaseous silicon tetrafluoride:

(1) $4CaF_2 + 2SiO_2 + 2H_2SO_4 \rightarrow$
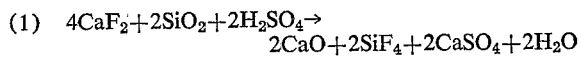
$2CaO + 2SiF_4 + 2CaSO_4 + 2H_2O$ (2a) $2Na_2SiF_6 + 2H_2SO_4 \rightarrow 2Na_2SO_4 + 2H_2SiF_6$ (2b) $2H_2SiF_6 \rightarrow 4HF + 2SiF_4$ (2c) $4HF + SiO_2 \rightarrow SiF_4 + 2H_2O$ $2Na_2SiF_6 + SiO_2 + 2H_2SO_4 \rightarrow 2Na_2SO_4 + 3SiF_4 + 2H_2O$ The gypsum produced in the manufacture of phosphoric acid admittedly contains certain amounts of silica and free sulphuric acid which effect a partial splitting-off of fluorine on heating.

If, however, one wishes to obtain the gypsum practically free of fluorine, it is necessary only to warm it after adding silica, in any desired form, and sulphuric acid, with the amounts added having to be at least so large that together with the quantities which are already present in the gypsum the stoichiometric quantities required according to Equations 1 and 2 above are attained.

In accordance with the present invention there is provided a process for removing fluorine and phosphate from gypsum produced in the manufacture of phosphoric acid by sulphuric acid digestion of crude phosphate, which comprises mixing moist filtered gypsum with at least such quantities of silica and sulphuric acid that, together with the amount of silica and free sulphuric acid already present in the gypsum, in said mixture the amount of these substances which is stoichiometrically required for liberating the fluorine compounds contained in the gypsum is present, and heating the resulting mixture for 3 to 30 minutes to a temperature of 200° to 400° C., washing with water after cooling, and separating the anhydrite from the water.

According to the Equations 1 and 2, it is necessary to add silica and sulphuric acid in an amount, that in the resulting mixture to be calcined there are present per two moles calcium fluoride, which was present in the gypsum, at least one mole silica and at least one mole sulphuric acid and per one mole alkali silicofluoride, which was present in the gypsum, at least one mole sulphuric acid and half a mole of silica.

The admixture of the silica and the sulphuric acid, with the latter appropriately of a concentration higher than 50% per weight, may also take place only during the calcination. The silicon tetrafluoride carried along with the escaping gases may be absorbed in water, with or without a preceding dust removal. The fluosilicic acid thus obtained as a by-product is a valuable raw material for the manufacture of fluorine-containing substances, for example aluminium fluoride. It is necessary to effect the calcination at temperatures above 200° C. since otherwise the resulting anhydrite is again hydrated and sets on subsequent washing. Temperatures above 400° C. are to be avoided since otherwise the soluble phosphate is rendered water-insoluble by the conversions indicated above. At the same time it is immaterial whether the gypsum is heated for a longer period, say about 15–30 minutes, to temperatures of 200 to 250° C. or for a shorter period, about 3 to 10 minutes, to temperatures of 300° to 400° C. After cooling the anhydrite thus obtained is suspended in water, whereupon the phosphate dissolves. After removal of the water the anhydrite which is now also largely free of phosphate may be granulated together with the remaining additives needed for the gypsum sulphuric acid process. The furnace powder manufactured from this anhydrite allows trouble-free operation of the furnace and produces a cement which fully meets standard specifications. The gases evolved in the course thereof then also no longer have a harmful effect on the sulphuric acid catalyst.

The following examples illustrate the process of the invention:

EXAMPLE 1

100 g. of gypsum from the manufacture of phosphoric acid, produced on processing North African phosphate, containing 24.6% of crude moisture, 20.8% of water of crystallisation, 1.64% of F, 1.08% of $P_2O_5$, 0.48% of $SiO_2$ and 0.85% of free $H_2SO_4$ (in percentages by weight) was mixed with 3 g. of sand and 2 ml. of 96% strength $H_2SO_4$ and heated for 15 minutes to 250° C. The anhydrite thus produced was suspended in 150 ml. of water, stirred for 10 minutes and filtered off. After drying in air, the anhydrite contained 3.9% of water of crystallisation, 0% of F and 0.29% of $P_2O_5$.

EXAMPLE 2

10 g. of the gypsum described in Example 1 was mixed with 3 g. of sand and 10 ml. of 96% strength $H_2SO_4$ and heated for 5 minutes to 350° C. The anhydrite thus obtained was stirred for 10 minutes with 150 ml. of water, whereby an anhydrite containing 0% of water of crystallisation, 0% of F and 0.35% of $P_2O_5$ was produced.

The same results were obtained, if the equivalent amount of a sulphuric acid of a concentration other than 96% per weight as described in the examples is used. Preferably sulphuric acid of a concentration higher than 50% is used, since water that had been added as aqueous sulphuric acid must be removed by subsequent calcination.

What we claim is:
1. A process for removing fluorine and phosphate from gypsum produced in the manufacture of phosphoric acid by sulphuric acid digestion of crude phosphate, which comprises mixing moist filtered gypsum with silica and sulphuric acid in amounts such that, together with the amounts of silica and free sulphuric acid already present in the gypsum, there are present at least one mole of silica and at least one mole of sulphuric acid per two moles of calcium fluoride, and at least one mole of sulphuric acid and half a mole of silica per mole of alkalisilicafluoride, heating the resultant mixture for 3 to 30 minutes to a temperature of 200° to 400° C., cooling and washing the mixture with water, and separating the resultant anhydrite from the water.

2. A process according to claim 1, in which the sulphuric acid added has a concentration higher than 50% by weight.

3. A process for removing fluorine and phosphate from gypsum produced in the manufacture of phosphoric acid by sulphuric acid digestion of crude phosphate, which comprises calcining moist filtered gypsum for 3 to 30 minutes to a temperature of 200° to 400° C. while adding to said gypsum during the calcination an amount of silica and sulphuric acid such that, together with the amounts of silica and free sulphuric acid already present in the gypsum, there are present at least one mole of silica and at least one mole of sulfuric acid per two moles of calcium fluoride, and at least one mole of sulfuric acid and half a mole of silica per mole of alkalisilicafluoride, cooling and washing the calcined product with water, and separating the anhydrite from the water.

References Cited

UNITED STATES PATENTS

| 1,969,449 | 8/1934 | Bryan | 106—34 |
| 2,418,590 | 4/1947 | Linzell et al. | 23—122 |

FOREIGN PATENTS

| 363,347 | 12/1931 | England | 23—122 |
| 1,104,738 | 2/1968 | England | 23—122 |

OSCAR R. VERTIZ, Primary Examiner

G. A. HELLER, Assistant Examiner

U.S. Cl. X.R.

106—109